United States Patent Office.

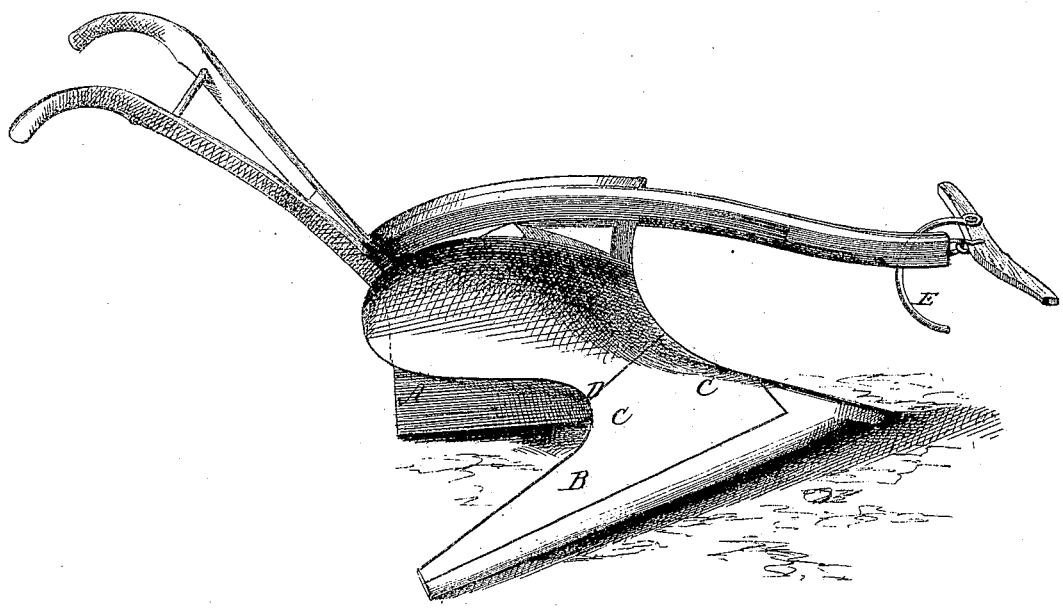

WILLIAM TRIPP, OF MECHANICSVILLE, NEW YORK.

Letters Patent No. 110,514, dated December 27, 1870.

IMPROVEMENT IN POTATO-DIGGERS.

The Schedule referred to in these Letters Patent and making part of the same.

*To all whom it may concern:*

Be it known that I, WILLIAM TRIPP, of Mechanicsville, in the county of Saratoga and State of New York, have invented a new and improved Potato-Digger; and I do hereby declare that the following is a full, clear, and exact description thereof, which will enable others skilled in the art to make and use the same, reference being had to the accompanying drawing forming part of this specification.

This invention relates to improvements in potato-diggers, and consists of a peculiar construction of one-sided shovel-shaped and plow-shaped diggers, as hereinafter specified.

The drawing represents a side elevation of my improved digger.

First, I make the land-side A of my plow-shaped digger broad enough to extend from the sole to the beam, so as to close the space commonly left open above the land-side of a plow, whereby the clogging which would occur by the tops is avoided.

Second, I make a broad and long shovel-shaped extension, B, of the mold-board and share, extending to the right far enough to run under the hills, while the land-side runs along the side of the row, and rising from the edge to the point C, on a straight incline of about four inches, more or less, to the foot, and at the rear I make a deep curved recess, D.

The beam is attached to the right side of the land-side, to cause the plow to run to land sufficient to cause the part B to run under and raise the whole of the hills.

E is a hook, attached to the plow-beam or to the evener, so as to run to the landward of the plow, to gather the tops and turn them to the mold-board side in advance of the plow, to prevent clogging in the throat.

This improved digger I use by plowing a shallow furrow under the hills, turning them all on one side, so that the earth and potatoes will rise together up the incline, during which time the earth, being composed of small particles, will naturally tend to work under the potatoes and cast them to the top, and at the recess in the end of the mold-board the earth will fall sooner than the potatoes, which still adhere to the vines, so that they they will be left exposed on the top, to be picked off.

By arranging the vine-gatherer in connection with the whiffle-tree, the effect is entirely different from what it would be if secured to the beam of the plow, since, in the latter case, it takes hold of the vines so near the roots as to pull them up, whereas it is only desirable to separate the vines.

Having thus described my invention,

I claim as new and desire to secure by Letters Patent—

The improved potato-digger, formed by the arrangement of the vertically-extended land-side A, and the mold-board or share, provided with the broad and nearly flat extension B, and U or V-shaped recess D, all constructed as shown and described.

WILLIAM TRIPP.

Witnesses:
JAMES P. BURTIS,
JOHN BEEDLESON.